March 29, 1949.  A. B. SCHULTZ  2,465,936
EMERGENCY ARRESTING DEVICE FOR MOVING OBJECTS
Filed April 26, 1945  4 Sheets-Sheet 1
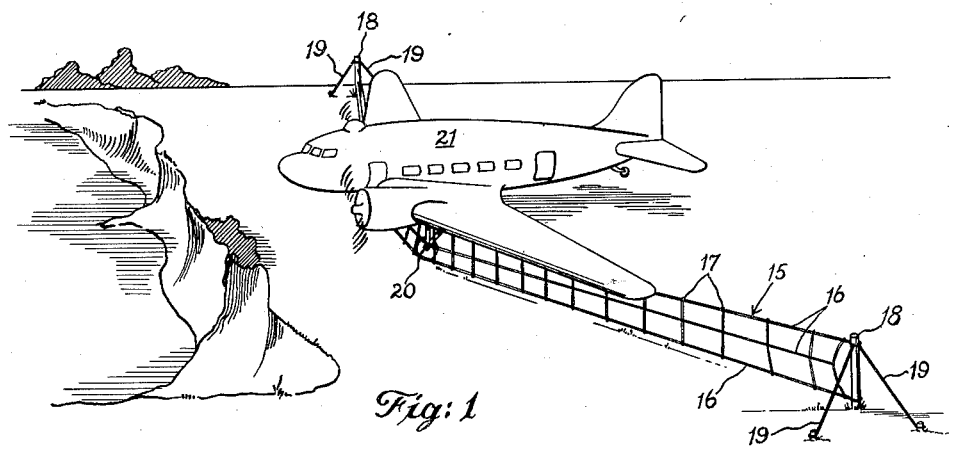
Fig: 1
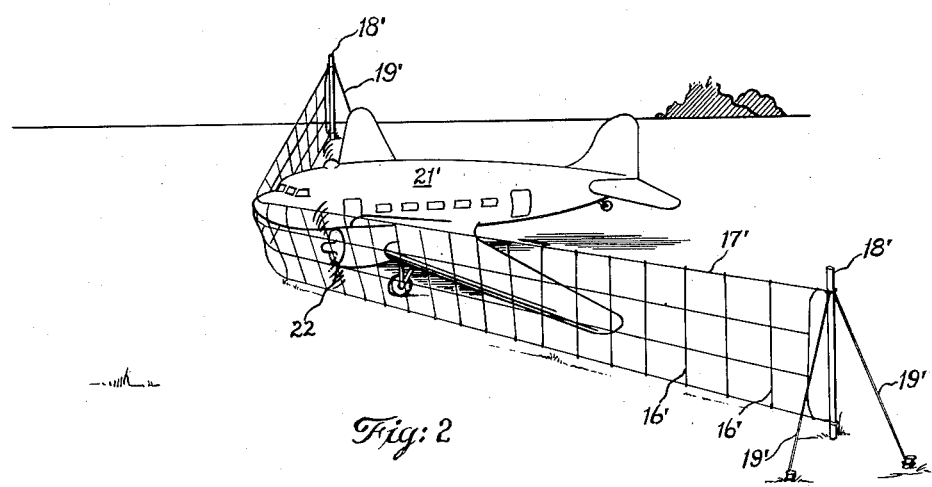
Fig: 2
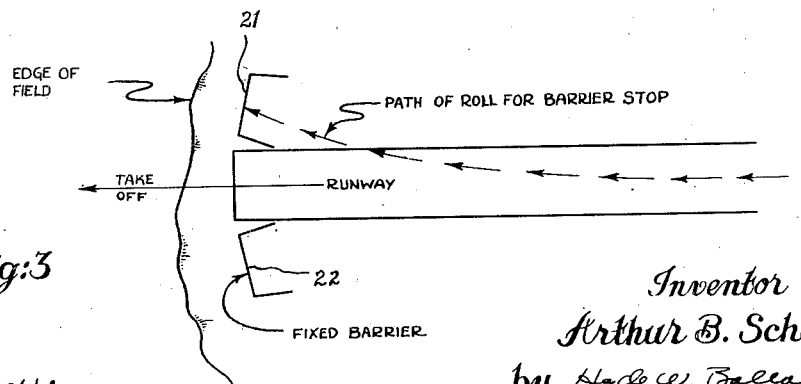
Fig: 3
Inventor
Arthur B. Schultz
by Hyde W. Ballard
Attorney
Witness:
Ann H. Backus March 29, 1949. A. B. SCHULTZ 2,465,936
EMERGENCY ARRESTING DEVICE FOR MOVING OBJECTS
Filed April 26, 1945 4 Sheets-Sheet 2
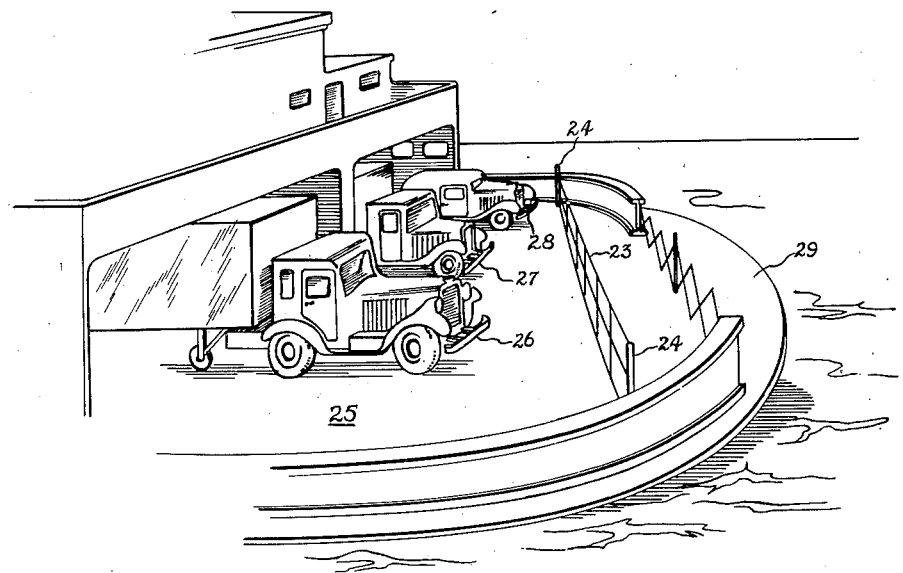
Fig: 4
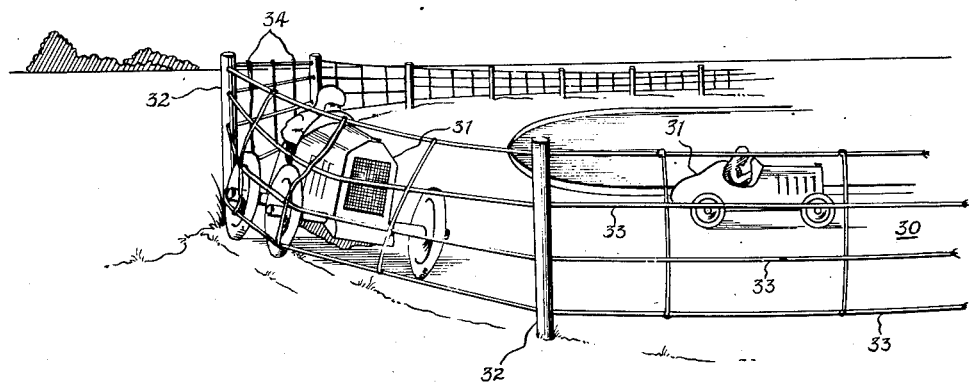
Fig: 5
Witness:
Ann H Backus
Inventor
Arthur B. Schultz
by Hyde W. Ballard
Attorney

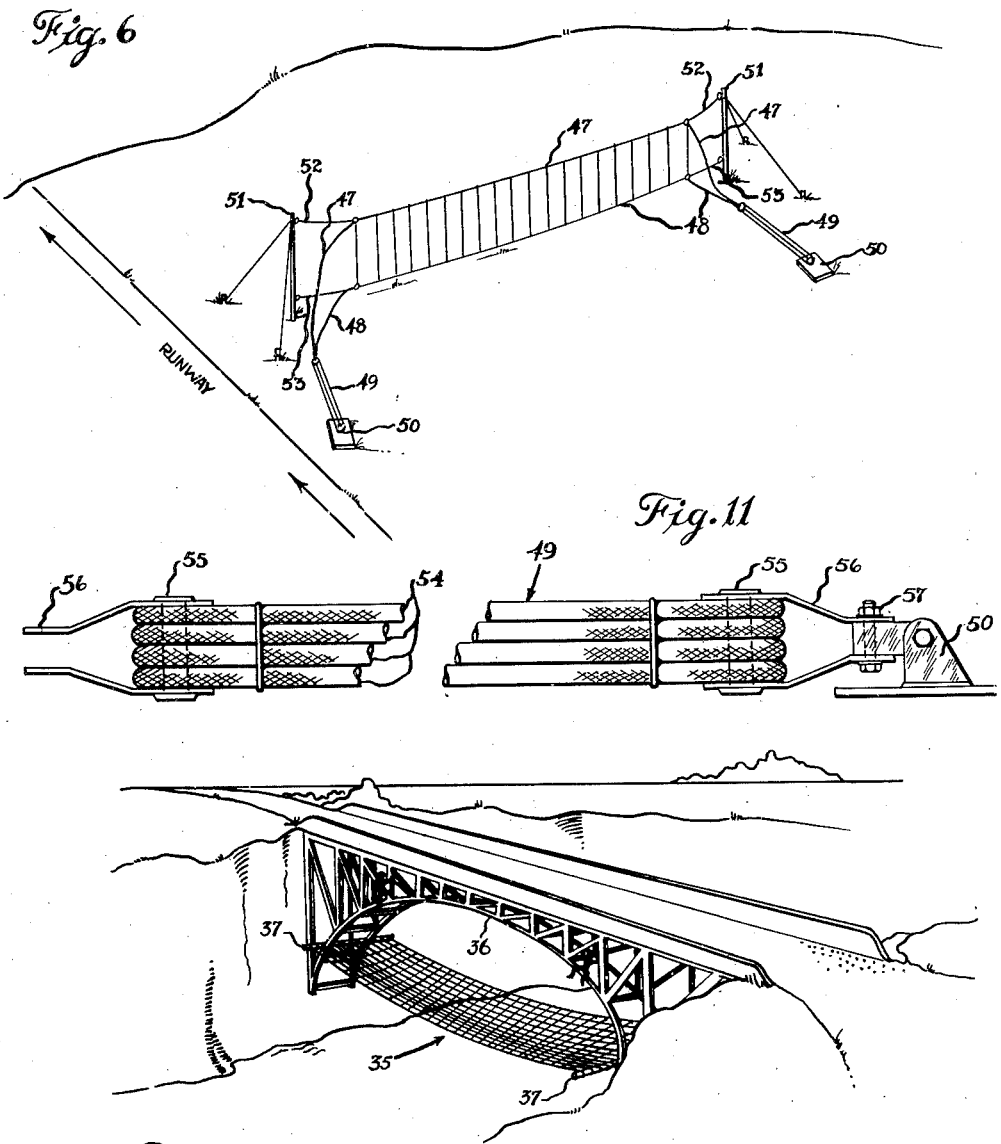

March 29, 1949. A. B. SCHULTZ 2,465,936
EMERGENCY ARRESTING DEVICE FOR MOVING OBJECTS
Filed April 26, 1945 4 Sheets-Sheet 4
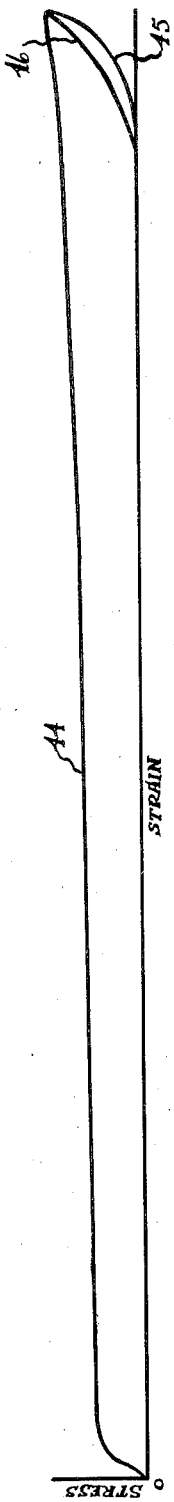
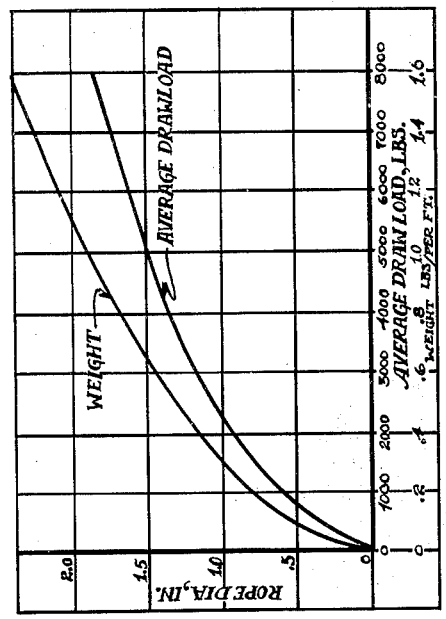
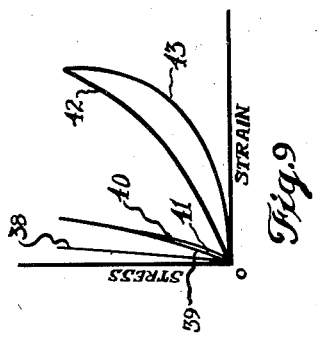
INVENTOR
ARTHUR B. SCHULTZ
BY Hyde W. Ballard
ATTORNEY Patented Mar. 29, 1949

2,465,936

UNITED STATES PATENT OFFICE 2,465,936

EMERGENCY ARRESTING DEVICE FOR MOVING OBJECTS

Arthur B. Schultz, Wilmington, Del., assignor to All American Airways, Inc., a corporation of Delaware Application April 26, 1945, Serial No. 590,397

21 Claims. (Cl. 244—110)

My invention relates to shock absorbing devices for decelerating both small and large objects which may be moving at relatively high velocities and more particularly to a safety barrier or net for vehicles and falling objects.

There has been proposed a variety of safety barriers for arresting and stopping moving objects including horses, motor vehicles, and even aircraft. Typical of such devices are the following patents: 1,428,163 Harriss, 1,687,147 Sawyer, 2,237,106 Minert, 2,263,649 Sawyer, and 2,295,205 Fraser. The prior art, however, discloses only a net for engaging the moving object and an independent shock absorbing device which is either entirely inadequate for the purpose intended or if adequate is extremely cumbersome, complicated, and expensive. My invention contemplates a net which dissipates the energy incident to decelerating the moving object by means of a change in the molecular structure of a synthetic plastic shock absorber which may be incorporated in the net itself or may be applied independently to any ordinary type of barrier.

An object, therefore, of my invention is to provide an emergency barrier for airports and landing fields which can be engaged by a pilot either on landing or take-off when the pilot discovers that an accident will occur either because of insufficient landing space or because of inability of the aircraft to become air borne before reaching the end of the take-off runway.

A further object is to provide a safety fence for automotive vehicles capable of completely decelerating a vehicle by means of the inherent dissipating characteristics of the fence itself.

Another object of the invention is to provide a safety net capable of arresting the fall of a human being by means of the inherent characteristics of the net and without physical injury to the human being.

A still further object is to provide a net or vehicle arrestor having high elongation characteristics whereby the moving object caught in the net is gradually decelerated without damage to the object or injury to the occupants thereof.

Further objects will be apparent from the specification and drawings, in which:

Fig. 1 is a diagrammatic view of a barrier for aircraft erected near the edge of a landing area to prevent the loss of an aircraft.

Fig. 2 shows a barrier similar to Fig. 1 but designed to engage the nose of the aircraft instead of merely its landing gear.

Fig. 3 is a plan view of a runway on an airfield showing the desirable location for the barriers.

Fig. 4 illustrates an application of my invention to an emergency gate on a vehicular ferry boat, which limits undesired movement of a vehicle initially at rest.

Fig. 5 illustrates the application of my invention to a safety fence for preventing damage to property and injury to persons in the case of a rapidly moving vehicle.

Fig. 6 illustrates an emergency barrier for airports showing independent shock absorbing elements constructed according to my invention.

Fig. 7 illustrates a safety net designed to catch accidently falling objects from high elevations and particularly human beings.

Fig. 8 is a graph showing a stress-strain diagram of a simple unoriented synthetic plastic material.

Fig. 9 is a stress-strain diagram showing comparative curves for steel, vegetable fiber, and oriented synthetic plastic material.

Fig. 10 is a graph showing the weight and average draw load of various rope diameters of unoriented nylon.

Fig. 11 is a detail of one of the shock absorbing elements shown in Fig. 6.

While certain novel features of the invention are disclosed herein with considerable detail with respect to certain particular forms of the invention, it is not desired to be limited to such details since many changes and modifications may well be made without departure from the spirit of the invention in its broadest aspect.

Like reference numerals denote like parts in the several figures of the drawings.

Referring now more particularly to the drawings, Fig. 1 shows a barrier or net designated generally by 15 composed of a plurality of horizontal plies 16 and a plurality of vertical plies 17. The net 15 is supported by posts 18 and guy wires 19. The height of barrier 15 is such that it will engage securely the landing gear or understructure 20 of an aircraft 21. My invention contemplates the location of a barrier on either side of the airport runway as illustrated in Fig. 3 in such a manner that the pilot can guide the plane into the barrier in the event that he overshoots the field or in the event that his brakes fail to hold. Also on take-off, should the plane be overloaded, thus preventing its getting into the air, the pilot may swerve sufficiently to engage either barrier 21 or barrier 22 (Fig. 3) which will prevent the plane's crashing over the edge of the field. Some airports are situated in such a way that the end of one or more runways terminates abruptly at a cliff as shown in Fig. 1 or some other obstacle, such as a forest or large body of water which would cause the total destruction of the aircraft and the probable loss of the personnel and cargo on board, should the plane overshoot the runway. It will be noted that the location of the barrier is such that normal take-off and landing operations are not interfered with in any way because the barriers are not directly in the path of normal flight.

Depending upon the nature of the airfield and operations involved, it may only be necessary to have a barrier high enough to engage the landing gear of the plane. It has been found in practice that even though the propeller tip when revolving extends lower than the uppermost ply 17 of barrier 15 that the barrier will not ordinarily be damaged, because the pitch of the propeller "corkscrews" past the upper ply. In the case of smaller aircraft operating at lower speeds such a net will prove adequate. Where, however, larger or faster planes are to be expected, it may be desirable to increase the height and number of plies of the net to engage the entire frontal area of the aircraft, as illustrated in Fig. 2. This barrier is supported by posts 18' and stays 19' but has many more vertical plies 16' and also more horizontal plies 17'. The use of more plies 16' and 17' in the barrier provides additional energy dissipating characteristics of the net because more material is required, and the manner in which the barrier operates to decelerate the aircraft without injury thereto will be more fully described hereinafter.

The higher barrier illustrated in Fig. 2 will be damaged to a greater or lesser degree by propellers 22 of aircraft 21'. A barrier of this nature is designed so that sufficient energy absorption is available to stop the airplane even though some of the horizontal and vertical plies become severed.

Barrier 23 (Fig. 4) supported by stanchions 24 on ferry boat 25 will prevent accidental loss of vehicles 26, 27, and 28 in the event that the vehicle brakes are not properly applied or in the event that the boat 25 should collide with the slip or another object. Barrier 23 is located some distance from the bow 29 of the boat in order to provide sufficient space for suitable elongation. It will be apparent that the distance required to stop an object having relatively low velocity, as would be the case with vehicles 26, 27, and 28, would be much less than the distance required to stop an object moving at high velocity, such as an aircraft.

Fig. 5 illustrates a safety barrier which may desirably be constructed around a racetrack 30 used for automobiles 31 or horses (not shown). It will be readily appreciated that such a safety fence may also be advantageously employed along highways to prevent vehicles from running off the road, particularly at dangerous locations. Posts 32 support sections of barrier similar to that illustrated in Figs. 1 or 2 having horizontal plies 33 and vertical plies 34. Plies 33 may be securely attached to each post 32 or to alternate posts depending upon the distance between the posts, the diameter of the plies, the force of the contemplated impact, and the nature of the material of which ply 33 is constructed as will be more fully described hereinafter.

It will be apparent that the barrier of Figs. 1 and 2 can also be constructed of any desired number of vertical or horizontal plies and that it is not limited to the stopping of objects having horizontal velocities only. As an example of such a device, a net 35 (Fig. 7) having any desired mesh can be strung under a location where persons may be engaged in hazardous occupations such as the constructing, repairing, or painting of a bridge 36. Net 35 is also adapted to be used for circus performers, fire escapes, and the like. The peculiar shock absorbing properties of net 35 make it particularly adaptable for a safety net because it is not necessary to install any independent springs or resilient devices. The net itself may be attached directly to the structure or to spreader poles 37 as desired.

The ability of a barrier or net to absorb the shock incident to the stopping or decelerating of objects, examples of which have been explained above, resides in the physical properties of the material of which all or some of the plies of the barrier are constructed. For this purpose, I contemplate the use of a molecularly unoriented synthetic plastic material. In effect the shock absorbing or energy dissipating function is performed by a molecular re-alignment occurring within the material of the shock absorber itself.

Materials which have this peculiar characteristic to a greater or lesser degree may be broadly grouped as follows: linear condensation polymers; vinyl type plastics, particularly vinylidene chloride and vinyl chloride; cellulose and cellulose esters; and rubber hydrochloride. Unprocessed nylon, a synthetic linear condensation polyamide, and undrawn polyethylene furnish good examples of materials which lend themselves to the dissipation of extremely high energy values. The methods of manufacturing nylon in its previously known forms have been disclosed in the prior art. Patent Nos. 2,071,250, 2,071,251, 2,071,253, 2,130,523, 2,137,235 and 2,190,770 to Carothers are representative.

High molecular weight polyamides such as nylon are capable of being spun into continuous filaments. The spinning may be carried out by the several methods referred to below. That is, the polyamide may be dissolved in a suitable solvent and the solution extruded through orifices into a coagulating bath, the resulting filament being continuously collected on a suitably revolving drum or spindle; or, the extruded solution may be passed through a heated chamber where the solvent is removed by evaporation. The properties of these polyamides also make it possible to spin the molten material directly without the addition of any solvent or plasticizer. For this purpose a mass of the molten polymer may be touched with a rod. Upon drawing the rod away, a filament is formed. The filament may be caught on a moving drum or reel and in this manner a continuous filament may be drawn from the molten mass until the latter is exhausted. The cross section of the filament thus obtained can be regulated by controlling the temperature of the molten mass and the rate of reeling. The higher the temperature and the more rapid the rate of reeling, the finer will be the filament.

Continuous filaments may also be produced by extruding the molten polyamide through an orifice and continuously collecting the extruded filament on a rotating drum. The fineness of the filaments may be controlled by varying the temperature of the molten polymer, the amount of pressure applied, the size of the orifice, and the rate of reeling. The filaments are wound on spools without any further cold drawing. These undrawn fibers or filaments are then fabricated into a line or rope of desired dimensions and weave. Such a line may be of the multifilament variety having a twisted or braided construction or the shock absorbing application may indicate the use of a single strand of monofilament line. Whether a multifilament or monofilament is used will depend to a large extent upon the length and diameter of the line required for the particular operation and the relative cost of manufacture. In weaving or twisting of the rope, constant care must be exercised to prevent the fibers from being substantially elongated over and beyond the amount required for the initial drawing or extruding operation.

A rope constructed in this manner has extremely unusual physical properties, not only with respect to ordinary vegetable fiber or steel lines but also with respect to a line made from oriented or completely drawn synthetic or plastic filaments as, for example, the material disclosed in the Carothers patents and also the material disclosed in application Serial No. 481,824, filed April 5, 1943 in the name of Richard C. du Pont, now U. S. Patent No. 2,407,634 of Sept. 17, 1946.

In order to illustrate graphically the striking difference between a barrier constructed of vegetable fiber or steel rope, reference is made to Figs. 8 and 9 which show the comparative shock absorbing properties of vegetable fibers, steel, oriented synthetic plastic material, and unoriented synthetic plastic material. Curve 38 illustrates the loading and unloading curve for steel below the elastic limit. It will be apparent that such a material follows Hooke's Law since the linear loading and unloading curves coincide exactly. Curve 39 represents the loading curve for a vegetable fiber such as hemp, manila, or sisal; whereas, 40 represents the unloading curve of the same material. It will be noted that there is a slight area between the loading and unloading curves 39 and 40 at 41 indicating a very small amount of hysteresis in this material. Reference No. 42 represents the loading curve of a typical sample of oriented synthetic plastic material such as nylon, whereas, 43 illustrates the unloading curve of the same material. Two characteristics of this material are at once obvious. First, stress is not proportional to strain even within the elastic limit, and second the loading and unloading curves do not coincide, and therefore, a relatively large area between the curves is present. This area represents hysteresis or energy dissipation.

Loading curve 44 (Fig. 8) is typical of an unoriented or undrawn synthetic plastic and 45 is the unloading curve of the same material. Curve 46 represents the curve for a subsequent loading after the material has become drawn. It will be noted that the material in Fig. 8 does not return to its original length and that it has approximately five per cent residual hysteresis. In other words, the original elongation is permanent for practical purposes and the work done over the non-recoverable portion of its elongation is absorbed in changing the molecular structure of the material. The elongation obtained with a material of this type ranges from 100% to 700%.

Another advantage lies in the fact that the tensile strength of the material does not decrease but the draw load increases as the material is elongated as illustrated graphically in Fig. 8. Fig. 10 shows the average draw load plotted against rope diameter. Fig. 10 also shows the weight of various rope diameters for undrawn nylon. By means of these curves, the rope diameter or the amount of material to be used in the rope can be ascertained when the average draw load is known.

It will be understood that a barrier made according to my invention may be constructed entirely from the shock absorbing material described above or merely the horizontal plies may be designed to absorb the shock or any desired combination of horizontal and vertical plies may be utilized. In addition, the shock absorbing elements may be made to be entirely independent of the barrier itself and may be used either with or without shock absorbing plies in the net. Such a construction is illustrated in Fig. 6 which shows a barrier having a pair of horizontal plies 47 and 48 attached to shock absorbing elements 49 which are in turn rigidly secured in the ground by anchors 50. Horizontal plies 47 and 48 are conveniently positioned to engage a moving object by stanchions 51 and detachable or frangible connections 52 and 53. When the moving object engages either plies 47 or 48 connections 52 and 53 will break and the object will be gradually decelerated by elongation of the elements 49.

Shock absorbers 49 are desirably constructed from a plurality of loops or strands 54 of unoriented synthetic plastic material. Loops 54 are attached to pins 55 and clevises 56 in any convenient manner, such as by bolt and nut 57. This construction facilitates replacement of the shock absorbing elements for subsequent use and in the case of a synthetic plastic material which may be affected by weather or sunlight, it permits the easy application of any suitable protective covering (not shown).

It will be understood that a shock absorbing barrier constructed according to my invention can be made to cover a wide range of loading characteristics, not only by varying the quantity of the plastic material used in the barrier or shock absorbing element, but also by varying the oriented condition of the material when the barrier is constructed. The shock absorbing element, therefore, may be partly drawn or oriented, in which case the energy dissipated will be correspondingly less, since the total energy dissipated varies in proportion to the amount of draw. It may be desirable to employ the same shock absorbing element for more than one shock absorbing operation, thus effecting considerable saving in cost.

Having thus described my invention, I claim:

1. In an arresting device for decelerating moving objects, a barrier assembly comprising a pair of supports, and a plurality of horizontal plies attached to said supports, said horizontal plies being constructed of a synthetic plastic material susceptible of at least one hundred per cent permanent elongation.

2. In an arresting device for decelerating moving objects, a barrier assembly comprising a pair of supports, a plurality of horizontal plies attached to said supports, and a plurality of vertical plies attached to said horizontal plies, said horizontal plies being constructed of a synthetic plastic material susceptible of at least one hundred per cent non-recoverable elongation.

3. In an arresting device for deceleration moving objects, a barrier assembly comprising a pair of supports, a plurality of horizontal plies attached to said supports, and a plurality of vertical plies attached to said horizontal plies, said horizontal plies and vertical plies being constructed of synthetic plastic material susceptible of at least one hundred per cent permanent elongation.

4. In an arresting device for decelerating moving objects, a barrier assembly comprising a pair of supports, a plurality of horizontal plies attached to said supports, and a plurality of vertical plies attached to said horizontal plies, at least some of said horizontal plies being constructed of synthetic plastic material susceptible of at least one hundred per cent non-recoverable elongation.

5. In an arresting device for decelerating moving objects, a barrier assembly comprising a pair of supports, a plurality of horizontal plies attached to said supports, and a plurality of vertical plies attached to said horizontal plies, at least some of said horizontal plies and at least some of said vertical plies being constructed of synthetic plastic material susceptible of at least one hundred per cent permanent elongation.

6. In a device for decelerating moving objects, a barrier assembly comprising a pair of supports, a plurality of horizontal plies attached to said supports, and plurality of vertical plies attached to said horizontal plies, said horizontal plies being constructed of a plurality of synthetic plastic filaments having an unoriented molecular arrangement.

7. Apparatus according to claim 6 in which the plies are comprised of unoriented nylon.

8. In airfield construction, a landing and take-off runway having an unobstructed terminus, a pair of emergency barriers on either side of said terminus and arranged substantially normal to the direction of said runway, and anchor means supporting said barriers in an upright position.

9. In airfield construction, a landing and take-off runway having an unobstructed terminus, a pair of emergency barriers on either side of said terminus and arranged substantially normal to the direction of said runway, anchor means supporting said barriers in an upright position, and shock absorbing devices connected to said anchor means, said shock absorbing devices comprised of an unoriented synthetic plastic material having an elongation of at least one hundred per cent.

10. As an article of manufacture, a safety net for aircraft barriers, said net being formed of a plurality of plies of unoriented synthetic plastic material susceptible of a permanent elongation of at least one hundred per cent when subjected to draw loads developed during deceleration of aircraft striking the barrier.

11. A safety net constructed in accordance with claim 10 in which at least some of the plies are constructed of unoriented nylon.

12. A safety barrier for aircraft and the like, comprising a pair of supporting stanchions, guy means for said stanchions, a barrier supported by said stanchions, a barrier ground anchor means positioned adjacent each end on the approach side of the said barrier and a shock absorbing member connected to each end of said barrier and to one of said anchor means.

13. A safety barrier for aircraft and the like comprising a pair of supporting stanchions, means for guying said stanchions, a barrier supported by said stanchions, and a shock absorbing device attached at each end of said barrier, said shock absorbing devices being constructed from an unoriented synthetic plastic material susceptible of at least one hundred per cent permanent elongation.

14. A safety barrier for aircraft and the like, comprising a pair of supporting stanchions, a barrier supported by said stanchions, a shock absorbing device attached at each end of said barrier, said shock absorbers being constructed from unoriented nylon, and anchor means for said shock absorbers.

15. A shock absorbing barrier for aircraft and the like comprising an upper horizontal ply and a lower horizontal ply, a plurality of vertical plies attached to said horizontal plies, a pair of stanchions, means for bracing said stanchions, means for supporting said upper ply on said stanchions, a shock absorber attached to said horizontal plies, and anchor means for said shock absorber, said shock absorber comprising a plurality of loops of an unoriented synthetic plastic material susceptible of non-recoverable elongation of at least one hundred per cent.

16. Apparatus according to claim 15 in which the shock absorbing loops are constructed of unoriented nylon.

17. Apparatus according to claim 15 in which the shock absorbing loops are constructed of unoriented polyethylene.

18. In a system for decelerating moving objects, a vertically supported flexible barrier, stationary anchor means on the ground, and means for connecting said barrier to said anchor means including a length of line comprised of unoriented synthetic fibers susceptible of at least one hundred per cent non-recoverable elongation under draw loads developed from impact of a moving object with the said barrier.

19. In a system according to claim 18 in which said connecting means include a length of unoriented nylon.

20. In a system according to claim 18 in which said connecting means include a length of unoriented polyethylene.

21. In airfield construction, a landing and take-off runway having an unobstructed terminus, an emergency barrier on one side of said terminus and arranged substantially normal to the direction of said runway, and anchor means supporting said barrier in an upright position.

ARTHUR B. SCHULTZ.

REFERENCES CITED

The following references are of record in the file of this patent:

UNITED STATES PATENTS

| Number | Name | Date |
|---|---|---|
| 236,226 | Hunt | Jan. 4, 1881 |
| 1,403,750 | Donovan | Jan. 17, 1922 |
| 1,639,158 | Alberts | Aug. 16, 1927 |
| 1,874,423 | Belleville | Aug. 30, 1932 |
| 2,130,948 | Carothers | Sept. 20, 1938 |
| 2,251,699 | Banschbach | Aug. 5, 1941 |
| 2,252,554 | Carothers | Aug. 12, 1941 |
| 2,324,726 | Sawyer | July 20, 1943 |
| 2,343,892 | Dodge | May 14, 1944 |

FOREIGN PATENTS

| Number | Country | Date |
|---|---|---|
| 539,002 | Germany | Nov. 23, 1931 |
| 838,276 | France | Mar. 2, 1939 |